United States Patent [19]

Jeong et al.

[11] Patent Number: 5,485,537
[45] Date of Patent: Jan. 16, 1996

[54] SINGLE CORE OPTICAL FIBER CONNECTOR

[75] Inventors: Myung-Yung Jeong; Seung-Ho Ahn; Oh-Gone Chun; Tae-Goo Choy, all of Daejeon, Rep. of Korea

[73] Assignees: Electronics and Telecommunications Research Institute, Daejeon-shi; Korea Telecommunications Authority, Seoul, both of Rep. of Korea

[21] Appl. No.: 351,219

[22] Filed: Nov. 30, 1994

[30] Foreign Application Priority Data

Sep. 10, 1994 [KR] Rep. of Korea ............ 94-22867

[51] Int. Cl.⁶ .................................................. G02B 6/38
[52] U.S. Cl. .................................................. 385/60
[58] Field of Search ............................ 385/56, 60, 61, 385/66, 68

[56] References Cited

U.S. PATENT DOCUMENTS

| | | | |
|---|---|---|---|
| 4,793,683 | 12/1988 | Cannon et al. | 350/96.21 |
| 4,834,487 | 5/1989 | Abendschein et al. | 385/78 |
| 4,867,525 | 9/1989 | DiMarco et al. | 350/96.20 |
| 5,311,609 | 5/1994 | Abe | 385/60 |
| 5,394,497 | 2/1995 | Erdman et al. | 385/60 |

FOREIGN PATENT DOCUMENTS 2711670 9/1978 Germany ............................ 385/68
62-139506 6/1987 Japan .................................. 385/60

*Primary Examiner*—Rodney B. Bovernick
*Assistant Examiner*—John Ngo
*Attorney, Agent, or Firm*—Larson and Taylor

[57] ABSTRACT

A single core optical fiber connector is disclosed in which an optical signal transmitting line between optical fibers is maintained or short-circuited with a low power loss by utilizing a sectional contact of a single core optical fiber. An elastic deformation energy of a polymer material is utilized so as to achieve the sectional contact for minimizing the loss, and precisely machined alignment devices are utilized so as to reduce the misalignment between the optical fibers, thereby improving the assemblability and the economy. The optical fiber sections which are lightly ground on a grinding paper are contacted by using a precisely machined alignment device and by utilizing the elastic deformation energy of the elastic ferrule. This contact is maintained by a coupling between a specially designed plug and an adaptor, thereby forming a structure of an optical fiber connector and an alignment device. The ferrule, the alignment device and the coupling structure which are the critical factors for the optical fiber connector are provided in the form of a new material, a new technique and a new structure. Consequently, the economy, the performance and the assemblability are improved, thereby contributing to the early settlement of the fiber optics system.

3 Claims, 2 Drawing Sheets

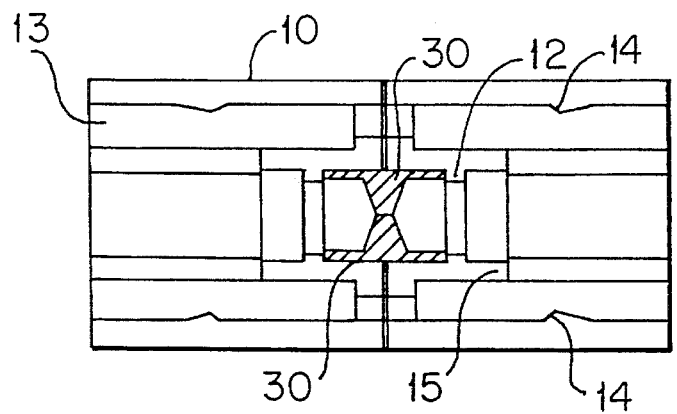
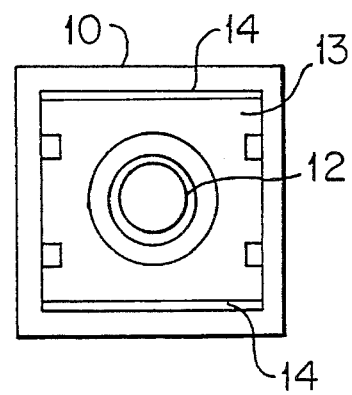
FIG. 3A          FIG. 3B
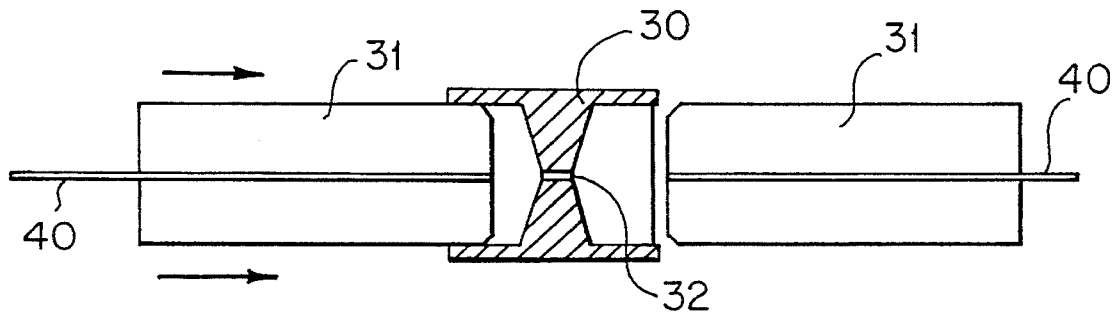
FIG. 4A
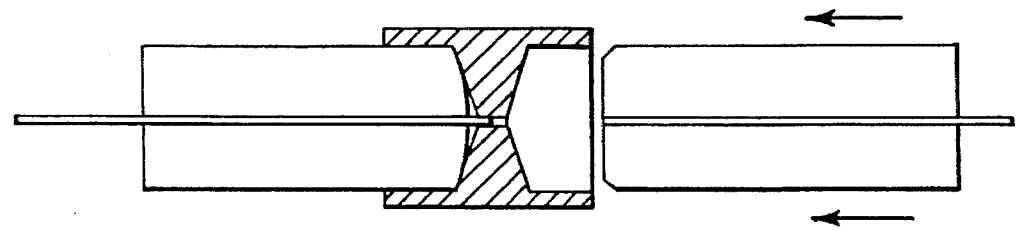
FIG. 4B
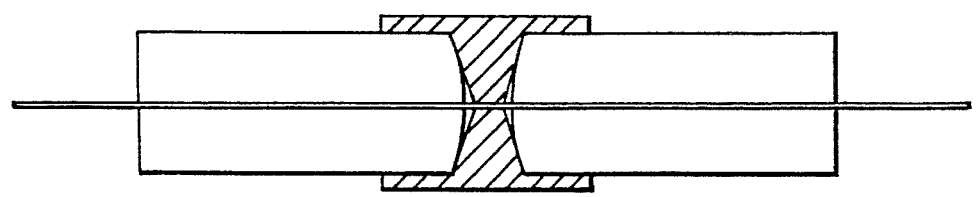
FIG. 4C

SINGLE CORE OPTICAL FIBER CONNECTOR

FIELD OF THE INVENTION

The present invention relates to a single core optical fiber connector in which an optical signal transmitting line between optical fibers is maintained or short-circuited with a low power loss by utilizing a sectional contact of a single core optical fiber.

BACKGROUND OF THE INVENTION

In accordance with the complication of the social structure, people live in the midst of diversified transactions of information, and therefore, there appeared a need for receiving large amounts of information. For this purpose, optical fibers have come to be widely utilized for receiving and transmitting information by using optical signals.

However, due to the manufacturing limit and the need for being connected to mechanical devices, discontinuous faces necessarily exist in optical fibbers. Such discontinuous faces require connecting devices for transmission of signals across the discontinuous faces.

For such discontinuous faces, optical connectors are used, but the optical propagating path in optical fibers is very narrow. Therefore, if the optical connector is not precisely manufactured, signals are damped, and therefore, a high amplification is required, because otherwise, an instability to the optical source may occur.

The optical fiber connector is not only a basic component of the optical communication, but also is used in large quantities in constructing an optical communication line.

In order to satisfy the need for improvement of the reflection characteristics of the optical connectors, refraction matching materials are used, or a ferrule section is formed inclinedly, or the residual stress layer of the physical contact section is eliminated.

However, the use of the matching materials has not been proved as to its reliability in relation with the temperature stability and the contamination. Meanwhile, if the grinding precision of the ferrule section is to be maintained, a specially designed grinder has to be used.

The grinding is continued generally for several minutes.

In the optical fiber connector, the push pull coupling structure is manufactured generally by the injection molding. At present, however, a coil spring is used for maintaining a coupling strength, and in coupling the optical fiber and the optical fiber connector, a coupling tool is necessarily used.

Or there are also adopted other structures which are provided with special functions such as a locking device specially designed for the plug or the adaptor.

In the conventional optical fiber connectors, ultra-high precision machined purrs are used for decreasing the insertion loss which is the most important factor of the optical fibers.

If the use of the ultra-high precision parts is increased, it becomes impossible to produce the optical fiber connector with the general processing method, and therefore, the production is limited, as well as increasing the production cost.

Further, much time is consumed in assembling the optical fiber connector, resulting the difficulty in connecting the communication lines. Therefore, if the assembling efficiency is to be improved, it is required that a new device has to be designed, and the number of the components has to be decreased.

Meanwhile, a locking device is used for stably maintaining the connection state after the completion of a connection of an optical fiber, but a rupture can occur due to a sudden overload. Therefore, a device has to be designed to prevent such a rupture.

Further, the adaptor has to have the function of preventing an externally caused deflection or other load sources so as to maintain the stability of the alignment. Further, the adaptor has to serve as a means for coupling with the plug, and has to have a function of improving the installing function.

SUMMARY OF THE INVENTION

The present invention is intended to overcome the above describe disadvantages of the conventional techniques.

Therefore it is the object of the present invention to provide a single core optical fiber connector in which an elastic deformation energy of a polymer material is utilized so as to achieve the sectional contact for minimizing the loss, and precisely machined alignment devices are utilized so as to reduce the misalignment between the optical fibers, thereby improving the assemblability and the economy.

In achieving the above object, the optical fiber sections which are lightly ground on a grinding paper are contacted by using a precisely machined alignment device and by utilizing the elastic deformation energy of the elastic ferrule. This contact is maintained by a coupling between a specially designed plug and an adaptor, thereby forming a structure of an optical fiber connector and an alignment device.

According to they present invention, the ferrule, the alignment device and the coupling structure which are the critical factors for the optical fiber connector are provided in the form of a new material, a new technique and a new structure. Consequently, the economy, the performance and the assemblability are improved, thereby contributing to the early settlement of the fiber optics system.

BRIEF DESCRIPTION OF THE DRAWINGS

The above object and other advantages of the present invention will become more apparent by describing in detail the preferred embodiment of the present invention with reference to the attached drawings in which:

FIG. 2 illustrates the constitution of the plug for securing the optical fibers, in which:

FIG. 3 illustrates the constitution of the adaptor for coupling the two plugs, in which:

FIG. 3a is a side sectional view; and

FIG. 3b is a frontal view;

FIGS. 4a, 4b and 4c illustrate the connected state of the optical fibers by using the ferrule and the alignment device.

DESCRIPTION OF THE PREFERRED EMBODIMENT

Figure 1:
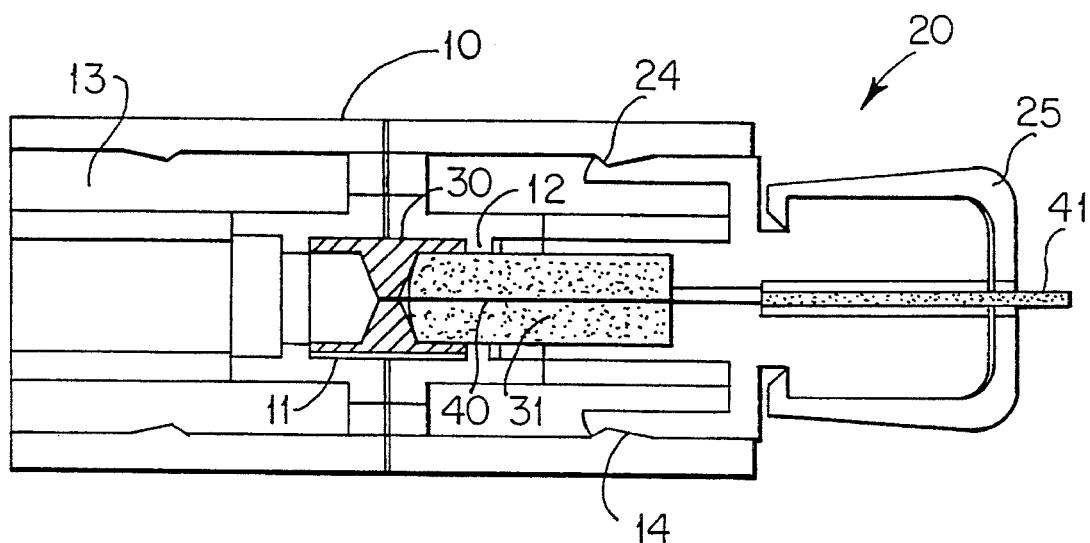
FIG. 1 is a sectional view showing the constitution of the single core optical fiber connector according to the present invention.
Figure 2A:
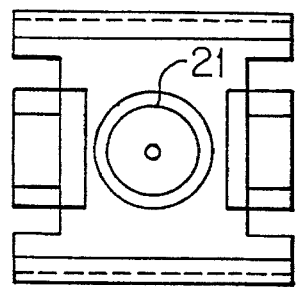
FIG. 2a is a frontal view.
Figure 2B:
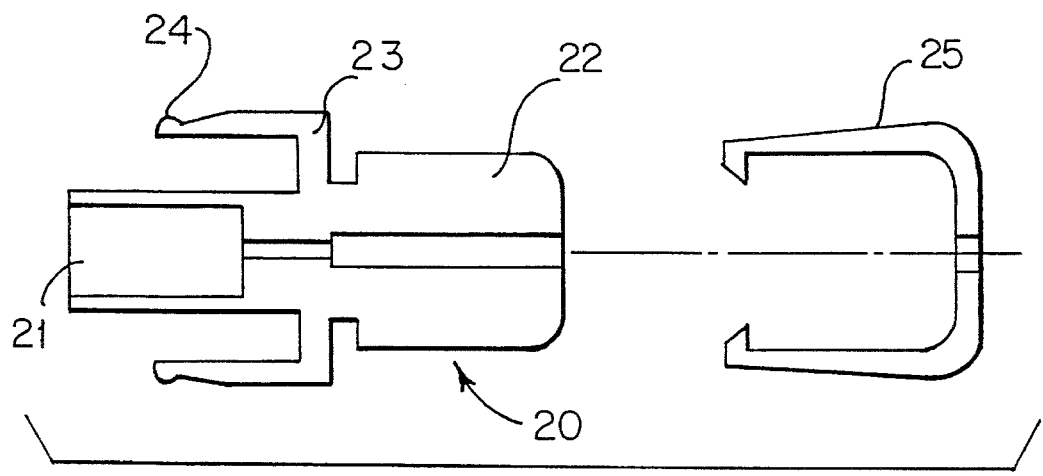
FIG. 2b is side sectional view showing a separated state.

FIG. 1 is a sectional view showing the constitution of the single core optical fiber connector according to the resent invention. FIG. 2 illustrates the constitution of the plug for securing the optical fibers. FIG. 3 illustrates the constitution of the adaptor for coupling the two plugs.

The single core optical fiber connector according to the present invention includes: an adaptor 10 for receiving plugs 20 including optical fibers 40 from the opposite sides while maintaining the alignment stability of the optical fibers 40; an alignment element 30 installed in an alignment element installing portion 11 of the adaptor 10 for guiding only the optical fibers 40 so as to form a precision connection; and a plug 20 for being coupled with the adaptor 10 as the final connecting portion of the optical fibers 40.

The adaptor 10 includes: an alignment element installing portion 11 installed within and coaxially with the adaptor 10; a guide projection 12 formed on the opposite end portions of the alignment element installing portion 11; and a hooking portion 14 formed on the inner circumference of a plug installing device 13 for facilitating the coupling of the plug 20.

The plug 20 includes: a ferrule guide portion 21 for firmly coupling a Kevlar Sheath 41 as a optical fiber reinforcing material and as the final connecting portion of the optical fibers 40, and for a proper positional maintaining of a ferrule 31 and preventing the deformation of it; and an adaptor contact portion 23 for maintaining the coupling with the adaptor 10.

The adaptor contact portion 23 has an elastic property, and serves as a spring by having a deflecting property. It further is provided with a hooking projection 24 so as to be hooked to the hooking portion 14 of the adaptor 10.

The ferrule guide portion 21 on which the ferrule 31 is positioned is formed in a circular shape like the ferrule 31 for preventing the deformation of the ferrule 31 and for maintaining the ferrule 31.

The connector of the present invention constituted as described above will now be described as to its action and effects.

As shown in FIG. 1, the plug 20 is press-fitted with the adaptor 10.

The hooking projection 24 of the plug 20 is engaged with the hooking portion 14 of the adaptor 10.

The optical fiber 40 is disposed between the plug 20 and the optical fiber coupling element 25 so as to be press-fitted to the plug 20.

The ferrule 31 which is disposed on the ferrule guide portion 21 produces a deformation energy due to the front end load, and this energy becomes the motive force for maintaining the physical contact of the optical fibers 40.

The plug 20 is the final connecting portion for the optical fibers 40, and it is integrally formed with the Kevlar Sheath 41 so as to reinforce the connection.

Further, a proper coupling portion is provided for maintaining the contact load which is produced during the coupling of the ferrule 31.

Particularly, the ferrule 31 on which the optical fiber 40 is attached is accurately guided to the alignment element 30, and the loss which is generated during the alignment is minimized.

The structure of the plug 20 which carries out the above described functions has an optical fiber contact portion 22 which is formed in a circular shape, so that the Kevlar Sheath 41 would be uniformly distributed, thereby fixing it in a snap form.

Further, the adaptor contact portion 23 is rectangular, so that it would have a deflection, thereby carrying out the function of a spring.

A load up to a certain level is supported by the hooking projection 24 and the hooking portion 14 of the adaptor 10, while it is detached under an overload so as to assure safety against an abrupt increase of load.

The adaptor 10 has a rectangular shape, so that the stability of the strength and the use would be improved. Within the adaptor 10 and on the alignment element installing portion 11, there is disposed the alignment element 30 which is precision-machined.

The alignment element 30 carries out a guiding for the alignment of the optical fibers 40, and maintains a precise contact. Further, it guides the plug 20 through a guide groove.

The ferrule guide portion 21 of the plug 20 which has been guided is aligned by an align guide portion 15 of the adaptor 10, and is stopped by the guide projection 12 which is installed for preventing the damages of the optical fibers 40 due to an overload.

FIG. 4 is a schematic view showing the process by which the optical fibers are connected by utilizing the elastic ferrule 31 and the alignment element 30.

The function of the elastic ferrule 31 is to protect the optical fibers 40 and properly deforms them, thereby making it possible to store a deformation energy.

An alignment hole 32 which is formed at the center of the alignment element 30 guides only the optical fibers 40 to achieve a precise connection.

Regarding the assembling procedure, the ferrule 31 is inserted along the alignment guide portion 15 of the alignment element 30. and the ferrule 31 is pressed and deformed by the insertion force of the plug 20, while the optical fiber 40 is inserted along the guide face into the precisely machined alignment hole 32 as much as the pressed amount.

Through the coupling of the plug 20, the two optical fibers 40 are connected within the alignment hole 32.

The connected optical fibers 40 maintain the connection by the help of the elastic deformation energy.

The present invention has successfully formed a widely used single core optical connector with a new structure and a new technique.

The single core optical connector according to the present invention maintains a sufficient contact between the optical fiber sections, and has optical characteristics such that the insertion loss is less than 0.5 dB, and the reflection loss is less than 25 dB. Therefore it can be applied to long distance single mode optical communications. Further, the economy is improved by reducing the number of the ultra high precision machined parts, and the assemblability is improved by using the snap structure, thereby making it possible to contribute to an early commercialization of fiber optics.

What is claimed is:

1. A single core optical fiber connector comprising:

an adaptor having an alignment element installing portion at the center within the interior, and having guide projections at the opposite sides to form a coupling means for receiving plugs including optical fibers from the opposite sides while maintaining the alignment stability of the optical fiber, said adaptor further provided with a hooking portion on the inner circumference of its plug insertion hole;

an alignment element installed in an alignment element installing portion of the adaptor for guiding only the optical fibers so as to form a precision connection; and a plug for being coupled with the adaptor as the final connecting portion of the optical fibers, said plug having an integrally formed sheath as the final connection portion of the optical fibers for reinforcing the optical fibers, said plug further having a ferrule guide portion for preventing the deformation of said ferrule and for maintaining a proper position for said ferrule, said plug further having a circular optical fiber contact portion for making said sheath uniformly distributed so as to be attached in the form of a snap structure, and said plug further having an adaptor contact portion provided with a hooking projection for being coupled with said hooking portion of said adaptor.

2. The single care optical fiber connector as claimed in claim 1, wherein said adaptor is characterized in that an alignment element is installed on an alignment element installing portion within said adaptor; said optical fibers are guided through a guide groove together with said plug to achieve a precise contact; and a guide projection is formed to prevent the damage of said optical fibers due to an overload.

3. The single core optical fiber connector as claimed in claim 1, wherein the contact between said optical fibers is formed through said ferrule and on said alignment element positioned on a guide projection of said adaptor; said ferrule installed within a ferrule guide portion generates a deformation energy during the alignment; and this energy maintains the physical contact of said optical fibers.

* * * * *